No. 887,517. PATENTED MAY 12, 1908.
J. W. RAUB.
REVERSING GEAR.
APPLICATION FILED OCT. 18, 1905.

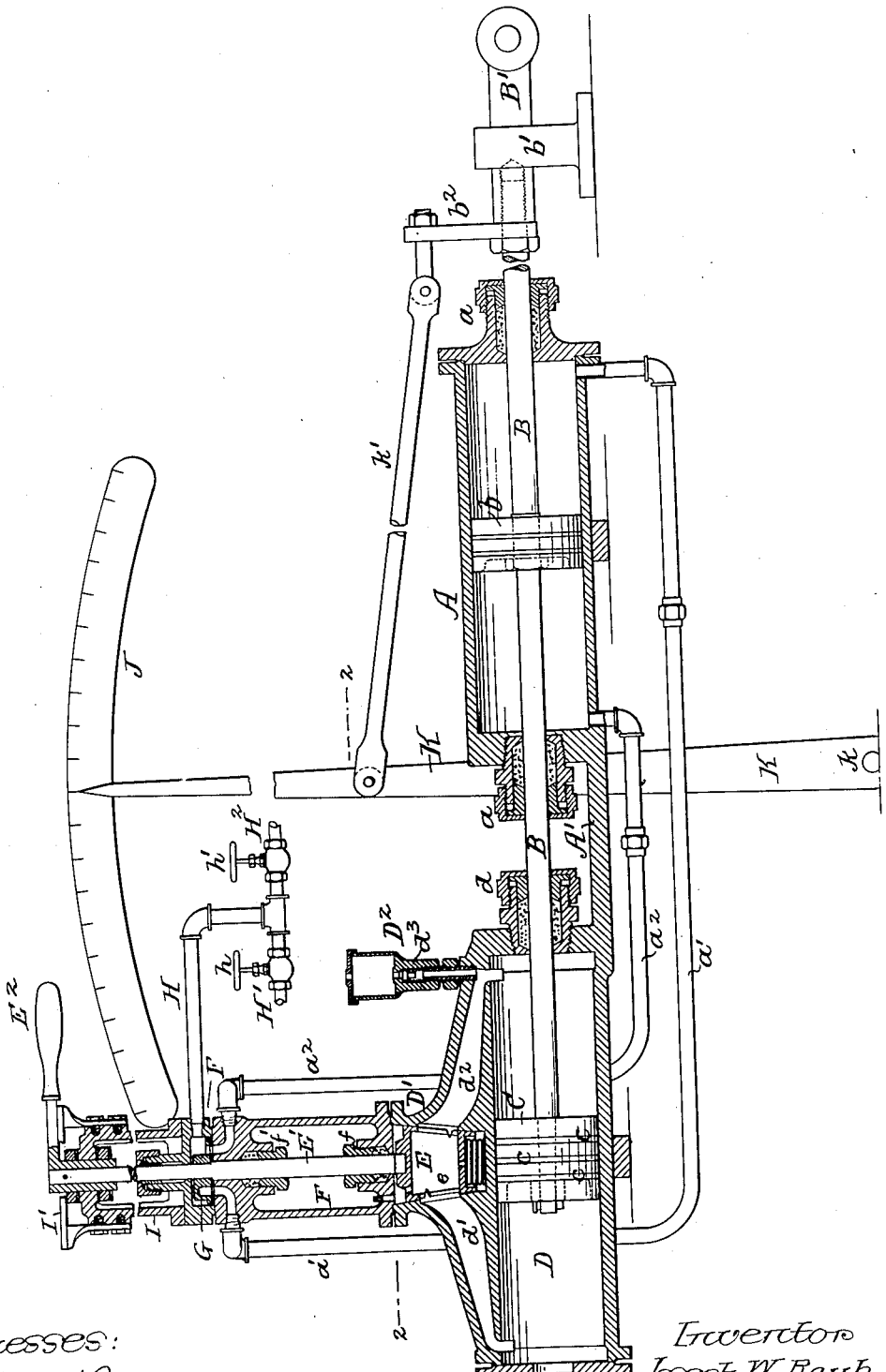

3 SHEETS—SHEET 2.

Witnesses:
Williams H. Rivoir
Walter F. Pullinger

Inventor:
Joseph W. Raub.
by his Attorneys
Howson & Howson

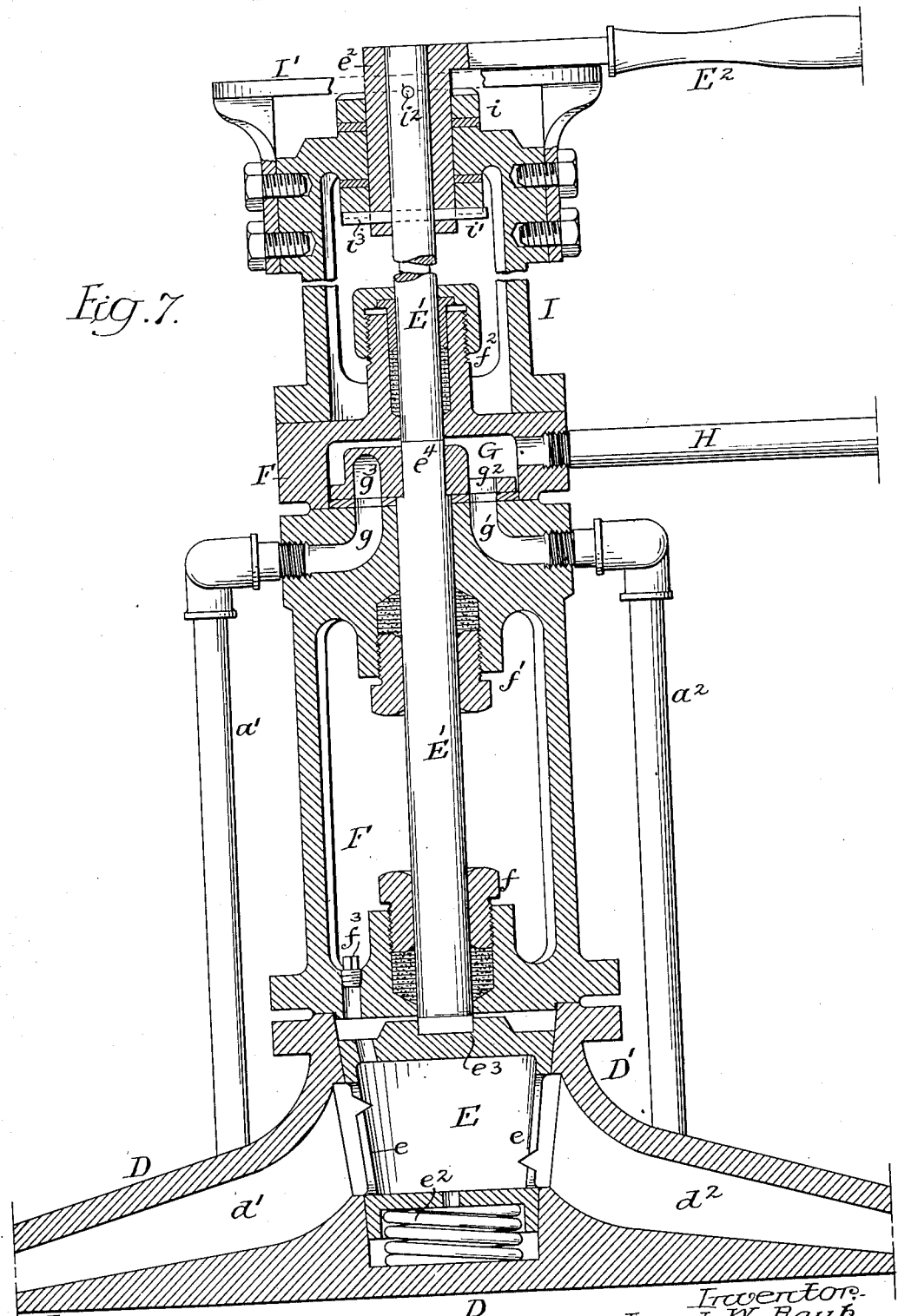

UNITED STATES PATENT OFFICE.

JOSEPH W. RAUB, OF PHILADELPHIA, PENNSYLVANIA.

REVERSING-GEAR.

No. 887,517.  Specification of Letters Patent.  Patented May 12, 1908.

Application filed October 18, 1905. Serial No. 283,280.

*To all whom it may concern:*

Be it known that I, JOSEPH W. RAUB, a citizen of the United States, residing in Philadelphia, Pennsylvania, have invented certain Improvements in Controlling Mechanism for Reversing-Gears, of which the following is a specification.

The object of my invention is to construct mechanism for operating the reversing gear of locomotive engines so that the gear can be operated at any speed desired and will be under complete control of the engineer, being locked at any point desired.

Figure 5:
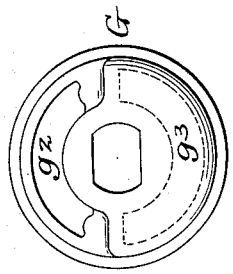
Figure 6:
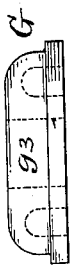
Figure 4:
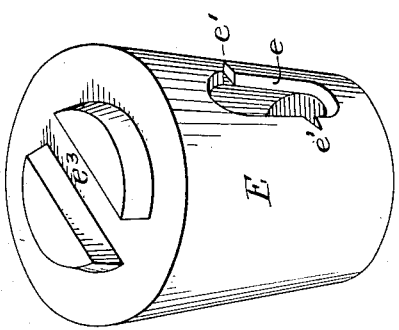
Figure 3:
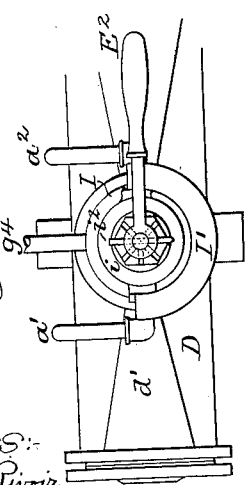
Figure 2:
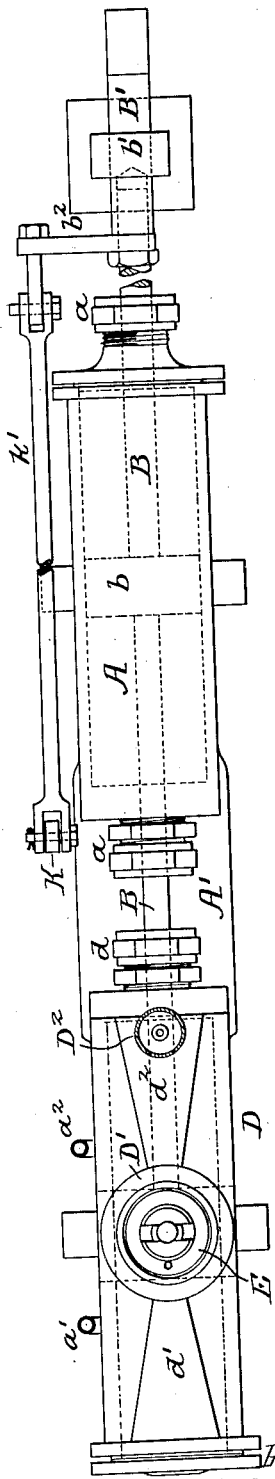

In the accompanying drawings, Figure 1, is a longitudinal sectional view of my improved controlling mechanism; Fig. 2, is a sectional plan view on the line 2—2, Fig. 1; Fig. 3, is a plan view of a portion of Fig. 1; Fig. 4, is a perspective view of the by pass valve; Figs. 5 and 6, are views of the air or steam valve; and Fig. 7, is an enlarged sectional elevation of the valve structure.

A is the operating cylinder having a stuffing box $a$ at each end.

B is a rod having a piston $b$ mounted in the cylinder A, this rod extends through the front stuffing box $a$ and is attached to a head B' arranged to slide in a bearing $b'$. The head B' is attached to the reversing rod of the locomotive. The cylinder takes the place of the usual reversing lever, and quadrant.

On a line with the cylinder A is a controlling cylinder D, having a piston C attached to the rear end of the rod B which extends through the rear stuffing box $a$ of the cylinder A and through a stuffing box $d$ of the cylinder D.

The two cylinders A and D are in line so that a single rod can be used and are preferably cast in a single piece being connected together by a web A'.

The piston C is long and has three packing rings $c$ in the present instance so as to prevent fluid passing the piston.

In the upper portion of the casting of the cylinder D is a valve chamber D' and a passage $d'$ leads from the rear end of the cylinder D to this valve chamber and a passage $d^2$ leads from the forward end of the cylinder to the valve chamber.

E is a valve for controlling the passage of fluid from one end of the controlling cylinder D to the other through said passages and consequently the speed of the movement of the piston C and the rod B will be dependent upon the displacement of fluid in the said cylinder.

The valve E has ports $e, e$, notched at $e'$, Fig. 4, so that on turning the valve the passages will be gradually opened.

$D^2$ is a fluid reservoir connected to one end of the passage $d^2$ in the present instance and $d^3$ is a spring check valve which will close with pressure from the cylinder but should any fluid escape from the cylinder, the check valve will be drawn down and fluid allowed to enter the cylinder from the reservoir.

The valve E is conical and the seat is shaped to fit the valve, and the chamber extends below the valve as shown so that the seat can be readily ground. In this chamber is a coiled spring $e^2$ which tends to force the valve off its seat, the valve being held to its seat by positive means described hereafter, this arrangement prevents the valve from sticking.

Secured to the cylinder casting is a standard F to which is secured the valve chamber F' of the cylinder A. The valve stem E' passes through the valve chamber F', a valve G and through the standard F and is coupled to the valve E, the valve stem has a head shaped to fit a slot $e^3$ in the valve.

The portion $e^4$ of the stem is squared to fit the opening in the valve G so that the valve will turn with the stem.

In the standard F are stuffing boxes $f, f'$ for the valve stem, and in the upper portion of the standard are ports $g, g'$ opening into the valve chamber F' and communicating with these ports are pipes $a', a^2$ which lead one to the forward end of the cylinder A and the other to the rear end of said cylinder.

The valve E has small passages in its upper and lower walls so that the fluid in the cylinder D may gain access to both ends of the valve, and I make a leakage port $f^3$ in the standard F above the valve E to allow any air to escape that finds its way above the valve, this port is closed by a screw plug as shown in Fig. 7.

A valve G is mounted in the valve chamber F' and has a segmental inlet port $g^2$ and a segmental exhaust passage $g^3$, Figs. 5 and 6. The valve can be turned by the rod E' so that air or steam under pressure will be admitted to one port while the other port will communicate with an exhaust passage $g^4$ in the standard F.

The inlet pipe H communicates with the valve chamber F' above the valve as shown in Fig. 7, and is connected preferably with two pipes H' and H². Pipe H' is an air pipe having a stop valve h, and H² is a steam pipe having a stop valve h'. By opening one valve and closing the other compressed air or steam can be used in the cylinder A.

The valve stem E' extends through a stuffing box f² in the valve casing and it is provided at its upper end with a handle E² by which it is turned.

The handle E² has a hub e² which extends through the upper portion of the standard I mounted on the valve chamber F, and can be held in any vertical position to which it is adjusted by nuts i, i', one on each side of the cross piece of the standard; the nuts being locked after adjustment by pins or other suitable means.

The pins i², i³, pass through slots in the nuts, and through openings in the valve rod and hub of the handle, and they act to hold the handle to the rod and the nuts in their adjusted positions.

I' is a segmental support for the handle E² and is secured to the standard by screws or other fastenings.

I preferably use an indicator to show at once the position of the reversing mechanism and the amount of cut off.

J is a segment suitably supported and scored to indicate the cut off.

K is an arm pivoted at a fixed point k and arranged to travel in front of the segment J. This arm K is connected by a rod k' to a projection b² on the head B' so that as the head is moved the arm will move with it.

It will be noticed that the ports in the controlling cylinder and the piston are so arranged that the piston will cushion at each end of the stroke, gradually cutting off the by-pass. The object of this construction is to prevent the blocks of the link motion striking the links, should the operator lose control of the mechanism.

The operation of my improved controlling mechanism for reversing gears is as follows: When it is wished to move the rod B and its head forward, the valve handle E² is so turned as to admit air or steam, according to which is used, into the rear end of the cylinder A but as the fluid in the cylinder D is on both sides of the piston and the by-pass closed the rod cannot be moved. On turning the valve handle further the valve E is turned to such a position as to open the by-pass and allow the fluid to pass slowly from the forward end of the cylinder to the back of the piston, consequently the rod will move forward as the fluid is displaced.

If it is wished to move the rod rapidly, the valve handle is thrown further around, allowing the full opening of the valve E and consequently the fluid will flow rapidly from one end of the cylinder D to the other, at the same time the indicator arm will travel over the segment. To stop the forward movement of the rod, the valve rod is turned to cut off the by-pass locking the rod B and its head.

When it is wished to move the rod in the reverse direction the valve handle is moved so that the rear of the cylinder A will be open to exhaust and the forward end of the cylinder will be open to air or steam under pressure and as the pressure is reversed upon the piston on the rod A the fluid in the cylinder D will travel from the rear end of the cylinder to the forward end of the cylinder at a speed indicated by the amount of opening of the valve E.

By turning the valve rod and closing the valves the piston rod in the cylinders can be stopped and locked at any point desired, as the by-pass for the fluid would be closed by the valve, thus the rod will be positively locked by the fluid so as to keep the reversing gear in the position to which it was set until again relieved by operating the valve rod.

I claim as my invention:—

1. The combination in a controlling mechanism for reversing gears, of a pressure cylinder and a controlling cylinder, pistons in each cylinder, means for connecting said pistons to each other and to the gear to be operated, a valve rod, two valves on said rod, one controlling the admission of fluid under pressure to the operating cylinder and the other controlling the flow of fluid from one portion of the controlling cylinder to the other, the latter of said valves being set to establish communication between the ends of the controlling cylinder only after fluid under pressure has been admitted to the operating cylinder, and having its seat formed in the said controlling cylinder, with a structure independent of but having conduits connecting it to the operating cylinder and provided with a seat for the valve governing the flow of fluid to said cylinder, substantially as described.

2. The combination of an operating cylinder and a controlling cylinder, a standard mounted on the controlling cylinder, a valve rod extending through the standard, a structure forming a valve chest in communication with both ends of the controlling cylinder, a valve in said chest attached to the valve rod, a second valve chest mounted on the standard with inlet and exhaust passages, conduits connecting said latter valve chest to the operating cylinder, and an operating handle for the valve rod, substantially as described.

3. The combination of a controlling cylinder having a by-pass communicating with its ends and provided with a valve chamber, a piston rod and a piston for the cylinder, the valve chamber having a tapered seat, a tapered valve in said seat, a spring under the valve, a rod for the valve, and means for adjusting the valve rod to adjust the valve to its seat, with an operating cylinder, a piston therein connected to said piston rod, and a valve also connected to said valve rod for controlling the flow of fluid to said operating cylinder, substantially as described.

4. The combination of an operating cylinder and a controlling cylinder, pistons respectively within said two cylinders, means for connecting said pistons to a device to be operated, said cylinders having a valve chamber, ports leading from said chamber to each end of the controlling cylinder, and a tapered seat in said valve chamber, a tapered valve having lateral ports mounted in said chamber, a spring under the valve, a valve rod for operating the valve, and means for adjusting said rod to put more or less pressure on the valve, substantially as described.

5. The combination of an operating cylinder and a controlling cylinder, pistons respectively operative within said cylinders, there being a by-pass communicating with each end of the controlling cylinder, a valve in the by-pass, a spring under the valve, a rod connected to the valve, a valve chest substantially in line with the controlling valve chamber and having ports communicating with each end of the operating cylinder, a valve in said latter chest connected to said valve rod, nuts for adjusting the valve rod, and a valve rod handle, substantially as described.

6. The combination of a controlling cylinder provided with a by-pass between its ends, a valve for controlling the passage of fluid through the by-pass, a reservoir communicating with the cylinder, a check valve in the passage between the reservoir and the cylinder arranged to permit the flow of fluid from the reservoir to the cylinder, an operating cylinder, pistons respectively operative in said two cylinders, means for connecting said pistons to each other and to the device to be operated, a valve for controlling the flow of fluid to the operating cylinder, and means for controlling the valves, substantially as described.

7. The combination in a controlling mechanism for reversing gears, of a controlling cylinder, an operating cylinder, a piston in each cylinder, means for connecting said pistons to each other and to the device to be operated, there being a by-pass connecting the ends of the controlling cylinder, a valve in said by-pass, a standard having mounted on it a valve chest, a valve therein, a second standard mounted on said valve chest, a valve rod extending through both standards and attached to both valves, a handle for the rod, nuts for adjusting said rod, and means for locking the nuts and handle to the rod, substantially as described.

In testimony whereof, I have signed my name to this specification, in the presence of two subscribing witnesses.

JOSEPH W. RAUB.

Witnesses:
WILL. A. BARR,
JOS. H. KLEIN.